United States Patent
Niwata et al.

(10) Patent No.: US 7,542,997 B2
(45) Date of Patent: Jun. 2, 2009

(54) COMPUTER SYSTEM AND FILE STORAGE/READ-OUT METHOD

(75) Inventors: Syouzou Niwata, Tokyo (JP); Yoshihiro Yano, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/587,057

(22) PCT Filed: Jan. 20, 2005

(86) PCT No.: PCT/JP2005/001045
§ 371 (c)(1),
(2), (4) Date: Jul. 21, 2006

(87) PCT Pub. No.: WO2005/078587
PCT Pub. Date: Aug. 25, 2005

(65) Prior Publication Data
US 2007/0112863 A1 May 17, 2007

(30) Foreign Application Priority Data
Feb. 18, 2004 (JP) ................................ 2004-040779

(51) Int. Cl.
G06F 12/00 (2006.01)
G06F 17/30 (2006.01)

(52) U.S. Cl. ........................... 707/200; 707/201
(58) Field of Classification Search .................. None
See application file for complete search history.

(56) References Cited

U.S. PATENT DOCUMENTS

| 5,627,996 | A | * | 5/1997 | Bauer | 703/20 |
| 5,778,068 | A | * | 7/1998 | Johnson et al. | 713/189 |
| 6,788,302 | B1 | * | 9/2004 | Ditlow et al. | 345/505 |
| 2002/0103885 | A1 | * | 8/2002 | Hamada | 709/219 |
| 2002/0116402 | A1 | * | 8/2002 | Luke | 707/200 |
| 2002/0133491 | A1 | * | 9/2002 | Sim et al. | 707/10 |
| 2004/0002942 | A1 | * | 1/2004 | Pudipeddi et al. | 707/1 |
| 2004/0093358 | A1 | * | 5/2004 | Ito et al. | 707/200 |

(Continued)

FOREIGN PATENT DOCUMENTS

JP 3-68042 3/1991

(Continued)

Primary Examiner—Mohammad Ali
Assistant Examiner—Angelica Ruiz
(74) Attorney, Agent, or Firm—Ladas & Parry LLP

(57) ABSTRACT

A computer system and file storage/read-out method. When storing data spread on a memory into a file storage unit, user α. assigns a meaningful filename-for-user, such as "sales book for April." A storage control unit converts the "sales book for April" to a meaningless filename-for-storage, such as "RST123." The correspondence between the two is stored as filename correspondence information for user α in a correspondence information storage unit. A storage processing unit stores the data with the filename "RST123." When user α is presented with a list of filenames of the stored files from a filename presentation unit, the meaningful filename of "sales book for April" is presented as the filename since a presentation control unit performs reverse conversion of the filename based on the filename correspondence information, and the meaningless filename of "RST123" is presented to other users. Security in regard to filenames can thus be secured, and inference of the file contents can be prevented.

14 Claims, 6 Drawing Sheets

U.S. PATENT DOCUMENTS

| | | | |
|---|---|---|---|
| 2004/0123111 A1* | 6/2004 | Makita et al. | 713/176 |
| 2005/0050054 A1* | 3/2005 | Clark et al. | 707/100 |

FOREIGN PATENT DOCUMENTS

| | | |
|---|---|---|
| JP | 2001-188697 | 7/2001 |
| JP | 2002-108870 | 4/2002 |
| JP | 2003-288247 | 10/2003 |

* cited by examiner

| CORRESPONDENCE INFORMATION STORAGE UNIT || ||
|---|---|---|---|
| FILENAME CORRESPONDENCE INFORMATION FOR USER α || FILENAME CORRESPONDENCE INFORMATION FOR USER β ||
| FILENAME FOR USER | FILENAME FOR STORAGE | FILENAME FOR USER | FILENAME FOR STORAGE |
| SALES BOOK FOR APRIL | RST123 | COMPANY X CUSTOMER FILE | ABC147 |
| SALES BOOK FOR MAY | UVW456 | COMPANY Y CUSTOMER FILE | DEF258 |
| SALES BOOK FOR JUNE | XYZ789 | COMPANY Z CUSTOMER FILE | GHI369 |

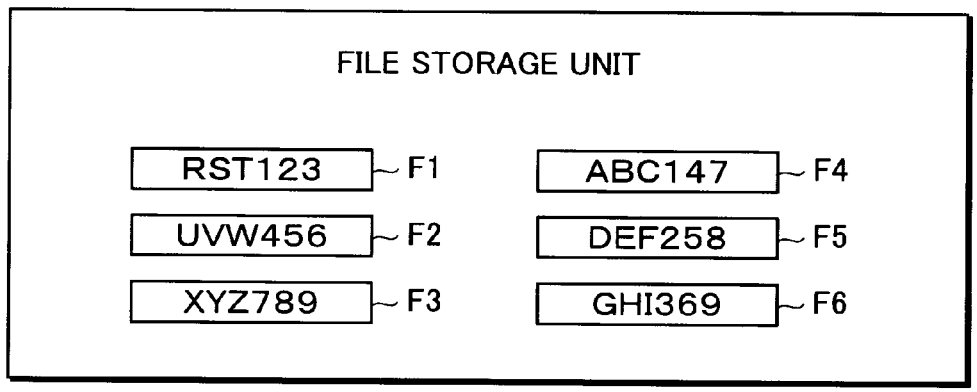

Fig.5A

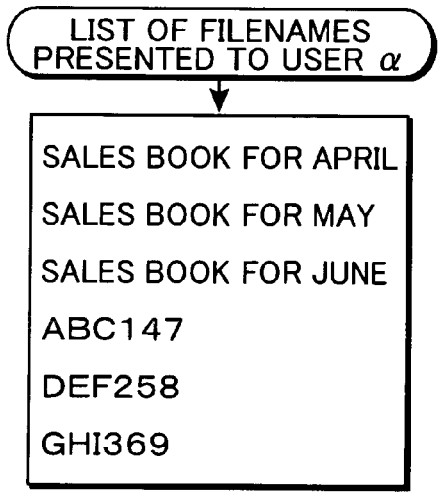

Fig.5B

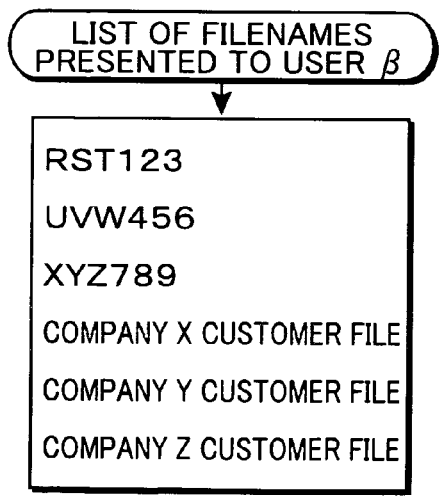

COMPUTER SYSTEM AND FILE STORAGE/READ-OUT METHOD

TECHNICAL FIELD

This invention relates to a computer system and a method for storing and reading files and particularly relates to a technical art by which the security is improved in regard to filenames during file storage.

BACKGROUND ART

In general, data in a computer system are handled in file units and storing and reading processes are also executed respectively in file units. Thus, in order to distinguish individual files from each other, predetermined filenames must be assigned to the respective files. In storing a file in a general application program, a user is enabled to assign an arbitrary filename to the file to be stored. Normally, the user assigns a filename that is considered to be optimal for enabling the contents, preparation date/time, etc., of the file to be stored to be ascertained readily.

There are application programs with which a function of automatically assigning a predetermined filename based on specific rules is prepared. For example, Japanese Unexamined Patent Publication No. 2001-188697 discloses an art, wherein when a file is placed in a particular folder to be monitored, a predetermined filename is assigned automatically to the file and the file is stored in a predetermined folder with a hierarchical structure.

As mentioned above, generally in saving a file, a user assigns a filename relevant to the contents of the file to be stored. Also, even in cases where a filename is automatically assigned as in the art disclosed in the above-mentioned patent Document, a filename that is somehow related to the contents of file is generally assigned. For example, in the case of a data file for an accounting process, by assigning a filename, such as "sales book for April," it can be understood at once that the file is that of sales data for April. Likewise, in the case of a customer data file, by assigning a filename such as "company X customer file," it can be recognized immediately that the file is that of data concerning customers of company X.

Thus, from the standpoint of a user who prepares a specific file and uses this file thereafter, assigning of a filename related to the contents of the file is extremely important for improving convenience. However, from the standpoint of security, such assignment of a filename based on convenience is not preferable. For example, the contents of a data file with the filename, "sales book of April," can be readily inferred by any person. When a list of such filenames is seen by another user, the type of information contained in the respective files will be made known without opening of the individual files.

Recently, due to the spread of LAN, numerous computers are connected via networks and it is not infrequent that one sees a list of files prepared by another person via the networks. Thus, if there is a possibility that the contents of a file can be inferred from the filename, the possibility of encountering such damages as an important file being copied illicitly or the file itself being destroyed or deleted by a user of malicious intent becomes high. As a matter of course, setting of access rights, encryption of data files, and other arts for protecting data files from attacks by illicit means are also employed. However, in regard to the security of a filename itself, measures that have been taken up until now are by no means adequate and there are many opportunities for lists of filenames to be seen by numerous users.

An object of this invention is thus to provide a computer system enabling adequate security to be ensured even for filenames and another object is to provide such a method for storing and reading files.

DISCLOSURE OF INVENTION (1) The first feature of the present invention resides in a computer system comprising: a memory, whereon data are spread; a program execution unit, applying processes, based on a predetermined program, to the data spread on the memory; a file storage unit, storing files formed of predetermined data; a storage processing unit, storing the data, spread on the memory, into the file storage unit as a file having an instructed, predetermined filename; a filename presentation unit, presenting, to a user, filenames corresponding to the respective files stored in the file storage unit; an spread processing unit, spreading, on the memory, data inside a file corresponding to a specific filename selected by the user from among the filenames presented by the filename presentation unit; and a user interface unit, serving an interface function with respect to the user;

the computer system further comprising:

a user recognition unit, recognizing a user who is logged in at the present time;

a storage control unit, which, when the storage processing unit is storing a file, inputs a filename-for-user from the user who is logged in, executes a filename conversion process of converting the filename-for-user to a filename-for-storage based on a predetermined algorithm, and provides to the storage processing unit an instruction to perform storage using the filename-for-storage;

a correspondence information storage unit, which, when the filename conversion process is carried out by the storage control unit, stores information, indicating a correspondence between the filename-for-user and the filename-for-storage, as filename correspondence information for the user who is logged-in;

a presentation control unit, which, when the filename presentation unit is performing a presentation of filenames, references the filename correspondence information for the logged-in user from inside the correspondence information storage unit and provides an instruction to present the filename-for-user in place of the filename-for-storage based on the filename correspondence information referenced; and an spread control unit, which, when the spread processing unit spreads data, inputs an instruction of selection of a filename-for-user from the logged-in user, references the filename correspondence information for the logged-in user from inside the correspondence information storage unit, executes a filename conversion process of converting the selected filename-for-user to a filename-for-storage based on the correspondence information referenced, and provides, to the spread processing unit, an instruction to spread data in a file with the filename-for-storage resulting from the conversion.

(2) The second feature of the present invention resides in a computer system according to the first feature, wherein:

the storage control unit executes the filename conversion process by generating a filename-for-storage that contains random codes based on an algorithm using random numbers.

(3) The third feature of the present invention resides in a computer system according to the first or second feature, wherein:

the correspondence information storage unit stores a correspondence table, indicating a correspondence between a filename-for-user and a filename-for-storage, as the filename correspondence information.

(4) The fourth feature of the present invention resides in a computer system according to the first feature, wherein:

the storage control unit executes the filename conversion process from a filename-for-user to a filename-for-storage by generating a filename-for-storage based on an algorithm for reversible conversion.

(5) The fifth feature of the present invention resides in a computer system according to the fourth feature, wherein:

the correspondence information storage unit stores information, indicating the reversible conversion algorithm used in the filename conversion process, as the filename correspondence information.

(6) The sixth feature of the present invention resides in a computer system according to the first to fifth features, wherein:

the storage control unit executes the filename conversion process on the entirety of a filename, including an extension portion.

(7) The seventh feature of the present invention resides in a computer system according to the first to sixth features, wherein:

the storage control unit executes a conversion process of converting not only a filename but also contents of timestamps or other attribute information that are stored along with a file, the correspondence information storage unit executes a process of storing, as the filename correspondence information, not just a correspondence of filenames but also a correspondence of attribute information before and after the conversion process; and the spread control unit executes a process of restoring converted attribute information based on the correspondence of attribute information before and after the conversion process.

(8) The eighth feature of the present invention resides in a computer system according to the first to seventh features, wherein:

the correspondence information storage unit executes a process of encrypting and then storing the filename correspondence information and executes, upon receiving a reference of the stored filename correspondence information, a process of decrypting and then presenting the information to be referenced.

(9) The ninth feature of the present invention resides in a computer system according to the first to eighth features, wherein:

the correspondence information storage unit is arranged from a portable information storage medium that can be freely attached to and detached from a main body of the computer system.

(10) The tenth feature of the present invention resides in a computer system according to the first to ninth features, wherein:

functions of the storage control unit, the spread control unit, and the presentation control unit are realized by incorporating a dedicated application program in a computer and the storage control unit, the spread control unit, and the presentation control unit are made to operate only when said program is started up.

(11) The eleventh feature of the present invention resides in a computer system according to the first to tenth features, wherein:

the file storage unit is arranged from a plurality of data storage devices that are configured distributedly, the storage processing unit is provided with a function of dividing a file to be stored into a plurality of partition files and storing the respective partition files in different data storage devices, the spread processing unit is provided with a function of synthesizing and thereby restoring the plurality of partition files, respectively stored in different data storage devices, to an original file and then spreading the original file on the memory, and the correspondence information storage unit is provided with a function of storing filename correspondence information indicating a correspondence of a "single filename-for-user" to a "plurality of filenames-for-storage," used as respective filenames of the partition files.

(12) The twelfth feature of the present invention resides in a program making a computer function as the storage control unit, the spread control unit, and the presentation control unit of the computer system according to the first to eleventh features.

(13) The thirteenth feature of the present invention resides in a file storage/read-out method that makes a computer system execute a storage process of storing data as a file with a predetermined filename into a file storage unit and a readout process of reading out data in a file stored in the file storage unit, said method making the computer system execute, in the storage process:

a storing user recognition step of recognizing a user who is logged in at the present time;

a storage filename input step of inputting a filename-for-user to be assigned to a file to be stored;

a filename conversion step of converting the filename-for-user to a filename-for-storage based on a predetermined algorithm;

a correspondence information storage step of storing information, indicating a correspondence between the filename-for-user and the filename-for-storage, as filename correspondence information for a user who is logged in; and a file storage step of storing the file to be stored into the file storage unit under the filename-for-storage; and in the readout process:

a reading user recognition step of recognizing a user who is logged in at the present time;

a readout filename input step of inputting a filename-for-user for specifying a file to be read out;

a filename referencing step of referencing a filename-for-storage, corresponding to the input filename-for-user, based on the filename correspondence information for a user who is logged in; and a file readout step of reading out a file stored in the file storage unit under the filename-for-storage, obtained by the referencing, as the file to be read out.

(14) The fourteenth feature of the present invention resides in a file storage/read-out method according to the thirteenth feature, wherein:

the readout filename input step is executed by a method whereby filenames-for-user corresponding to respective files stored in the file storage unit are referenced and displayed in a list based on the filename correspondence information and a user is made to select a specific filename from among the filenames displayed in the list.

With this invention, since filenames that are actually used for storing are changed automatically, adequate security can be ensured even for filenames.

BRIEF DESCRIPTION OF DRAWINGS

FIG. 3 is a diagram showing an example of contents stored in a correspondence information storage unit 80 in the computer system shown in FIG. 2.

FIG. 4 is a diagram showing an example of the storage state in a file storage unit 50 in the computer system shown in FIG. 2.

FIGS. 5A, 5B show diagrams of filename lists that are presented to users using the filename correspondence information shown in FIG. 3 in the storage state shown in FIG. 4.

BEST MODE FOR CARRYING OUT THE INVENTION

This invention shall now be described based on the illustrated embodiments.

<<<Section 1. General Computer System>>>

Figure 1:
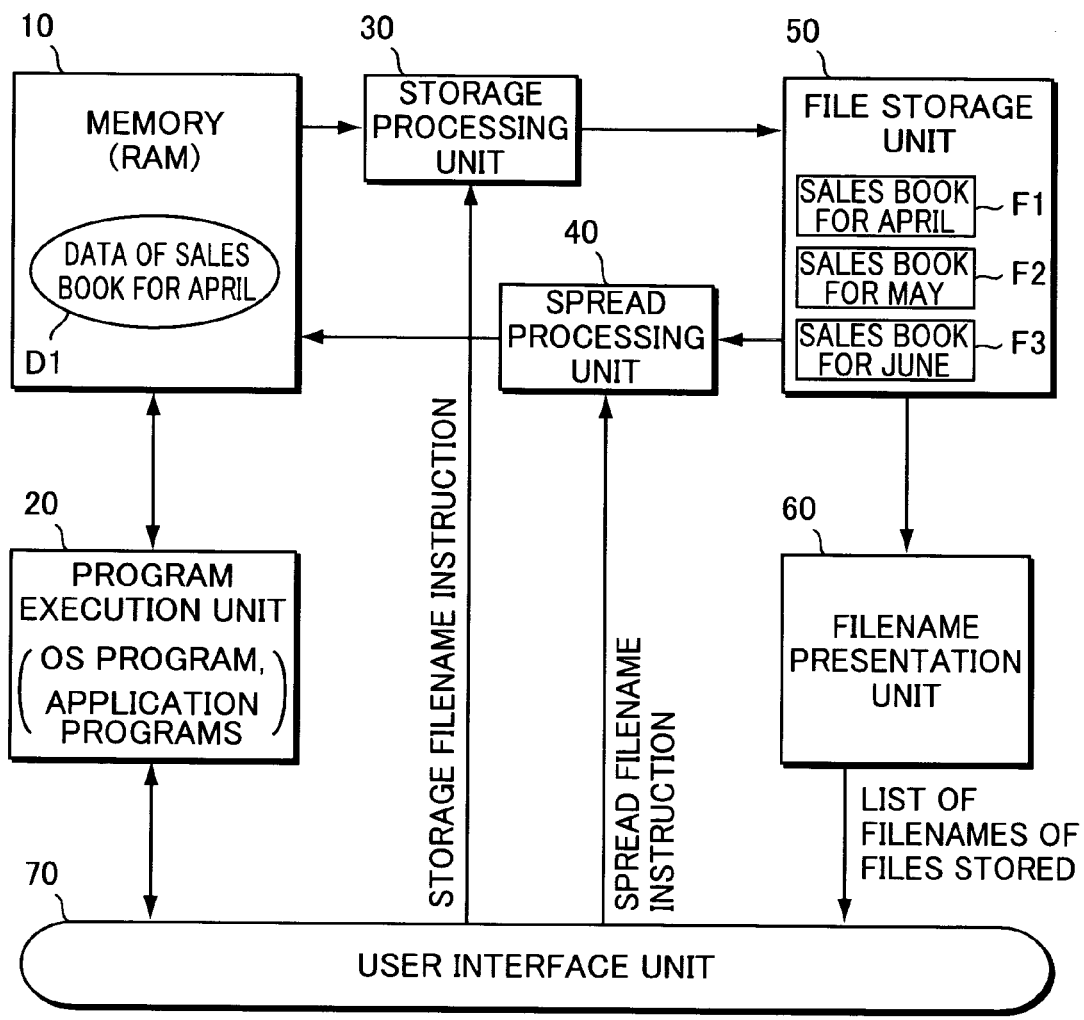
FIG. 1 is a block diagram showing components involved in file storage and read-out processes in a general computer system.

FIG. 1 is a block diagram showing components involved in file storage and read-out processes in a general computer system. As illustrated, this computer system comprises the respective elements of a memory 10, a program execution unit 20, a storage processing unit 30, an spread processing unit 40, a file storage unit 50, a filename presentation unit 60, and a user interface unit 70. In general, memory 10 is arranged from a RAM or other volatile memory and is used for spread and temporary storage of data to be processed. Program execution unit 20 is a component having a function of applying predetermined processes, based on predetermined programs, on the data which are spread on memory 10 and is realized by a CPU or other logical processing hardware and an OS program, application programs, and other software. Though obviously a hard disk device, ROM, or other memory that stores the respective programs, a portion of a RAM that is used as a working area during program execution, etc., are also components that make up program execution unit 20, here these elements shall be referred to collectively as program execution unit 20.

As mentioned above, memory 10 is a storage area on which data to be processed by program execution unit 20 are spread temporarily, and data for which processing has been completed are transferred from memory 10 to file storage unit 50. That is, file storage unit 50 is a component that stores predetermined data as files, and in actuality, a hard disk device, floppy disk device, or other magnetic recording device, a CD-R, CD-RAM, DVD-R, DVD-RAM, or other optical recording device, or an MO recording device or other magneto-optic device, etc., is used as file storage unit 50. In the FIGURE, a state wherein three files F1 to F3 are stored in file storage unit 50 is illustrated. Specifically, file F1 is stored under the filename, "sales book for April," file F2 is stored under the filename, "sales book for May," and file F3 is stored under the filename, "sales book for June." In the illustrated example, of these three files, the contents of file F1 are spread on memory 10 as "data D1 of the sales book for April" and subject to processing by program execution unit 20. When the necessary processing of "data D1 of the sales book for April" is completed, data D1 can be stored again inside file storage unit 50 as file F1 having the filename, "sales book for April."

Storage processing unit 30 is a component that executes a storage process (save process) of storing data spread on memory 10 as a file with a predetermined designated filename into file storage unit 50, and oppositely, spread processing unit 40 is a component that executes an spread process (load process) of reading out data in a specific file selected by a user from among the files stored in file storage unit 50 and spreading the data on memory 10 (that is, in the case of a general application program, a process of opening the specific file). Filename presentation unit 60 serves a function of presenting predetermined filenames, corresponding to the respective files stored in file storage unit 50, to the user. In actuality, storage processing unit 30, spread processing unit 40, and filename presentation unit 60 are realized by driver programs and OS program portions that concern the storage devices that make up file storage unit 50.

User interface unit 70 is a component that serves an interface function with respect to the user and carries out the necessary information transactions between the user and the system comprising the respective components described above. Specifically, a keyboard, mouse, etc., are used as devices for the user to perform input operations with respect to the system, and a monitor, speakers, etc., are used as devices for the system to perform output operations with respect to the user. User interface unit 70 is a component formed of a complex of these input/output devices.

Via user interface unit 70, the user can perform transactions with program execution unit 20, input predetermined data and instructions into program execution unit 20, and obtain execution results as outputs. Also, in storing the data spread on memory 10 into file storage unit 50, the user can instruct a predetermined storage filename to storage processing unit 30 from user interface 70. Storage processing unit 30 executes the storage process under the filename instructed by the operator. For example, when an input of instructing the filename, "sales book for April," to be the "storage filename" is made, storage processing unit 30 executes the process of storing data D1, spread on memory 10, as file F1 with the filename, "sales book for April," into file storage unit 50.

The operator can also be presented with a filename list from filename presentation unit 60 via user interface unit 70. For example, in the case of the illustrated example, since the three files F1 to F3 are stored in file storage unit 50, filename presentation unit 60 performs a process of presenting, to the user, the filenames, "sales book for April," "sales book for May," and "sales book for June," corresponding to the three files. When the user performs an input operation of selecting, via user interface unit 70, a specific filename from among the filenames presented by filename presentation unit 60, this selection is transmitted to spread processing unit 40 as an instruction of the "spread filename," and spread processing unit 40 executes the spread process of spreading, on memory 10, the data in the file corresponding to the specific filename selected by the user. For example, when the user selects the filename, "sales book for April," this filename is transmitted as the spread filename to spread processing unit 40 and spread processing unit 40 executes the process of spreading data D1 in file F1 in file storage unit 50 on memory 10.

Though the basic arrangement of a conventional computer system was described above using the block diagram illustrating the components involved in the file storage and read-out processes, as mentioned above, such a conventional computer system is inadequate in terms of security with respect to filenames. For example, with the example shown in FIG. 1, since the file names, "sales book for April," "sales book for May," and "sales book for June," are assigned to files F1 to F3 stored in file storage unit 50, when a list of the filenames stored is displayed on a monitor screen by filename presentation unit 60, it can readily be inferred by any person that the files stored in this computer system are data concerning the sales of specific months. In particular, when this computer system is connected to a network, the possibility that the filenames of the files stored in file storage unit 50 will be seen by other users via the network will be high.

<<<Section 2. Basic Embodiment of this Invention>>>

Figure 2:
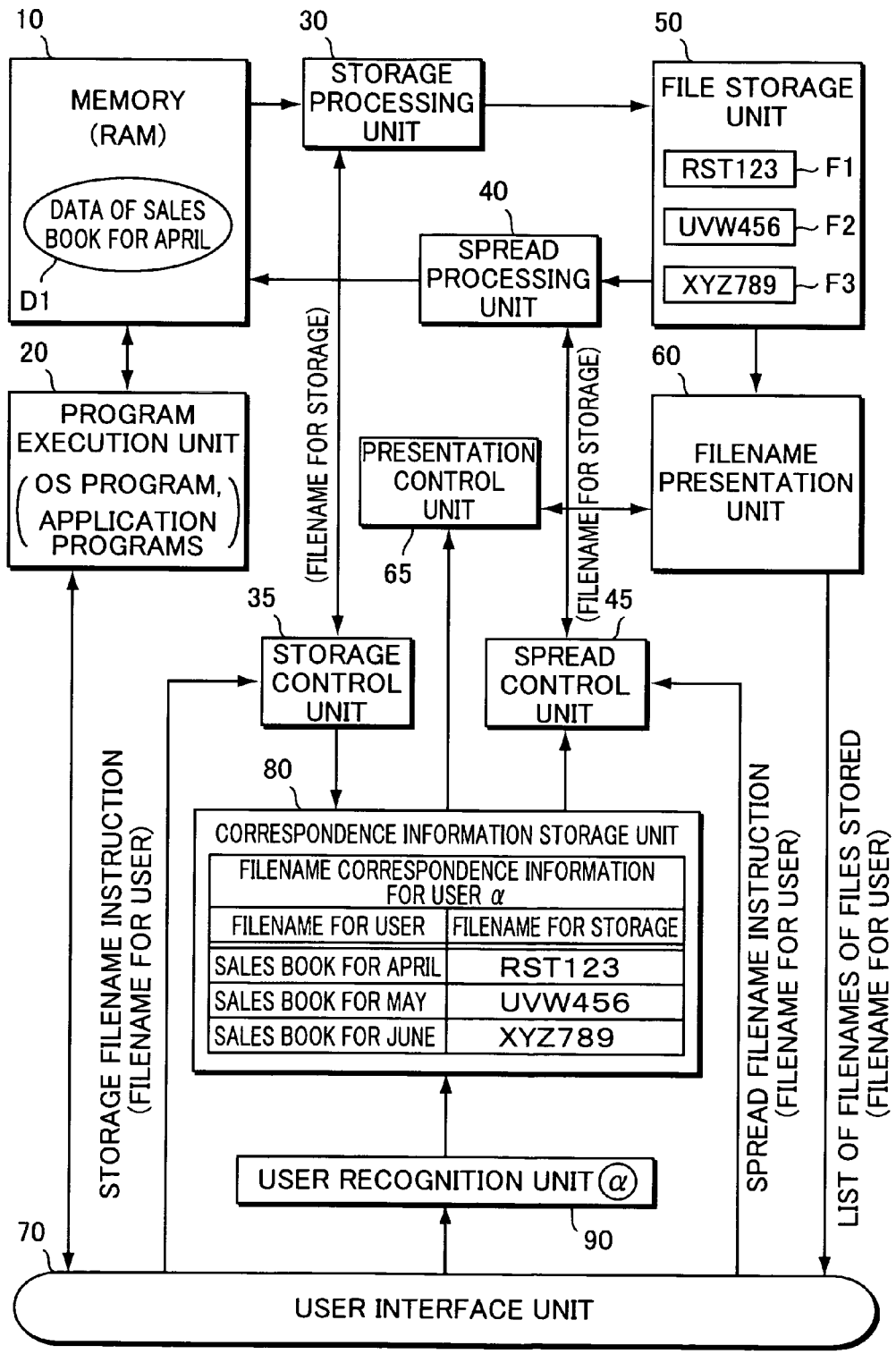
FIG. 2 is a block diagram showing a computer system of a basic embodiment of this invention.

FIG. 2 is a block diagram showing a computer system of a basic embodiment of this invention. The computer system shown in FIG. 2 has a storage control unit 35, a spread control unit 45, a presentation control unit 65, a correspondence information storage unit 80, and a user recognition unit 90 added thereto as new components with respect to the general, conventional computer system shown in FIG. 1, and by the addition of these components, adequate security can be ensured for filenames as well. The functions of these new components shall first be described.

User recognition unit 90 is a component with a function of recognizing the user who is logged in at the present time. In the illustrated example, an "α in circle" mark is indicated in the block of user recognition unit 90, and this indicates that the user who is currently logged in is "user α." Though this user recognition unit 90 is not drawn in the computer system shown in FIG. 1, in actuality, a computer system, such as a personal computer that is presently used in general, is equipped with a function of recognizing the user who is logged in at the present time, and such a general user recognition function may be used adequately as it is as user recognition unit 90. Normally in logging into a computer system as a specific user, a verification process that requests an account and a password unique to the user is executed. The illustrated example shows a state where "user α" has logged in using a unique account and has completed the verification process by inputting a predetermined password.

Meanwhile, storage control unit 35, spread control unit 45, and presentation control unit 65 are components having functions of providing predetermined instructions to and thereby controlling storage processing unit 30, spread processing unit 40, and filename presentation unit 60, respectively. The functions of these components shall now be described in order.

When storage processing unit 30 stores a file, storage control unit 35 serves the functions of inputting a "filename-for-user" from the user who is logged in, executing a filename conversion process of converting this "filename-for-user" to a "filename-for-storage" based on a predetermined algorithm, and provides to storage processing unit 30 an instruction to perform storage using the "filename-for-storage" obtained by the conversion.

Here, for the sake of convenience, the functions of this storage control unit 35 shall be described with a specific example of processes that are performed when a task of storing data D1, spread on memory 10, is performed by user α while user α is logged in. As was described in Section 1, in storing data D1, user α performs an input of instructing the filename (filename for specifying file to be stored) to be assigned to data D1 via user interface unit 70. Here, the filename instructed by user α shall be referred to as the "filename-for-user." This "filename-for-user" is literally a filename for the user and a character string that is considered to be most suitable for ascertaining the contents of the data file is normally used. Since in the illustrated example, data D1 is the data of the sales book for April, the description shall be continued with the filename, "sales book for April," being instructed as the "filename-for-user."

With the conventional computer system described with FIG. 1, when the filename, "sales book for April," is instructed, data D1 are stored under this filename. Meanwhile, with the present invention, a filename conversion process is carried out by storage control unit 35. That is, the "filename-for-user" is converted to a different "filename-for-storage" based on the predetermined algorithm. Though as mentioned above, a character string that is suited for ascertaining the contents of a file is suited as the "filename-for-user," there is no such need in regard to the "filename-for-storage." In contrast, it is preferable to use a code string that is unsuitable for ascertaining the contents of a file as the "filename-for-storage." Put in another way, the process of conversion from the "filename-for-user" to the "filename-for-storage" that is performed in storage control unit 35 has the significance of being a process of conversion from a "filename suited for ascertaining the contents of the file" to a "filename that is not suited for ascertaining the contents of the file." Here, suppose that the filename-for-user, "sales book for April," is converted to the filename-for-storage, "RST123." The filename, "RST123," has no relation whatsoever to the contents of the "file concerning the sales of April" and the contents of the file thus cannot be inferred from this filename.

When the conversion from the "filename-for-user" to the "filename-for-storage" has been carried out, storage control unit 35 transmits the "filename-for-storage" after conversion to storage processing unit 30 and provides to storage processing unit 30, an instruction to perform storage using the "filename-for-storage." Thus, with the above example, storage processing unit 30 executes the storage process of storing data D1, on memory 10, into file storage unit 50 not under the filename-for-user of "sales book for April" but under the filename-for-storage of "RST123." File F1, stored in the illustrated file storage unit 50, is the file that has thus been stored. Files F2 and F3 are also files stored under the "filenames-for-storage" through the same processes.

Consequently, though the three files F1 to F3, stored in file storage unit 50 in FIG. 1 and the three files F1 to F3 stored in file storage unit 50 in FIG. 2 are files of exactly the same contents, whereas the former are stored under the "filenames-for-user," the latter are stored under the "filenames-for-storage" and thus differ respectively in filename. That is, whereas with the former, the filenames, "sales book for April," "sales book for May," and "sales book for June," which are suited for inference of the file contents, are assigned, with the latter, since the meaningless filenames of "RST123," "UVW456," and "XYZ789," are assigned, even if these filenames are seen by other users, a problem in terms of security will not arise in regard to filenames with the latter case.

When the filename conversion process has thus been performed by storage control unit 35, information indicating the correspondence between the "filename-for-user" and the "filename-for-storage" are stored as filename correspondence information concerning the logged-in user into correspondence information storage unit 80. With the illustrated example, a state is shown wherein a correspondence table, indicating the correspondence for the three files, is stored in correspondence information storage unit 80 as the filename correspondence information for user α who is logged in. That is, a correspondence table, indicating that "RST123" corresponds to "sales book for April," "UVW456" corresponds to "sales book for May," and "XYZ789" corresponds to "sales book for June," is prepared inside correspondence information storage unit 80. Such a correspondence table is prepared since the process of storing the illustrated three files F1 to F3 in file storage unit 50 has been performed. The filename correspondence information prepared in correspondence information storage unit 80 is referenced by spread control unit 45 and presentation control unit 65 as shall be described later.

Presentation control unit 65 serves a function of slightly modifying the display processing function of filename presentation unit 60. As described above, filename presentation unit 60 has the function of presenting, to the user, the filename list of files stored in file storage unit 50. However, since the respective files are stored under the "filenames-for-storage" in file storage unit 50 as in the illustrated example, if filename presentation unit 60 presents the filenames as they are, user α will not be able to check the filenames with the "filenames-for-user" that were assigned by him/herself. Thus, when filename presentation unit 60 performs the presentation of filenames, presentation control unit 65 provides an instruction to reference the filename correspondence information for the logged-in user from inside correspondence information storage unit 80 and present the "filenames-for-user" instead of the "filenames-for-storage" based on the correspondence information that were referenced. More specifically, presentation control unit 65 performs a process of converting the "filenames-for-storage" that were about to be presented by filename presentation unit 60 to the "filenames-for-user" by referencing the "filename correspondence information."

With the example shown in FIG. 2, though file name presentation unit 60 will normally present the filenames, "RST123," "UVW456," and "XYZ789" (the filenames-for-storage), of the three files F1 to F3 that are stored in file storage unit 50, here, presentation control unit 65 references the filename correspondence information (the illustrated correspondence table) for user α that is stored in correspondence information storage unit 80 and converts the file names to "sales book for April," "sales book for May," and "sales book for June" (the filenames-for-user) and provide to filename presentation unit 60 an instruction to present the filenames after conversion. The list of the "filenames-for-user" is thus presented to user α.

Meanwhile, when spread processing unit 40 spreads data, spread control unit 45 inputs the selection instruction of a "filename-for-user" from the user who is logged in, references the "filename correspondence information" for the logged-in user from inside correspondence information storage unit 80, executes the filename conversion process of converting the selected "filename-for-user" to a "filename-for-storage" based on the correspondence information that were referenced, and provides to spread processing unit 40 an instruction to spread the data inside the file with the "filename-for-storage" resulting from the conversion.

With the example shown in FIG. 2, to user α, the filename list of "sales book for April," "sales book for May," and "sales book for June" is presented as mentioned above. Here, when user α selects the filename, "sales book for April," as the spread filename, spread control unit 45 references the filename correspondence information (the illustrated correspondence table) for user α that is stored in correspondence information storage unit 80 and converts the filename, "sales book for April," to the filename, "RST123," and provides to spread processing unit 40 the instruction to spread the file stored under the filename, "RST123." Thus, by spread processing unit 40, the data of file F1, which is stored in file storage unit 50 under the filename, "RST123," are read out and spread on memory 10.

Thus, with this invention's computer system shown in FIG. 2, the file storage process and readout process are carried out by the following procedures.

Firstly, the procedures of a storage process, by which data on memory 10 are stored in file storage unit 50 as a file with a predetermined filename, shall be described. First, a storing user recognition step, wherein the user who is logged in at the present time is recognized by user recognition unit 90, is carried out. A storage filename input step, of inputting the "filename-for-user" to be assigned to the file to be stored (data D1 in the illustrated example) by means of storage control unit 35, is then carried out, and a filename conversion step, of converting the "filename-for-user" to a "filename-for-storage" based on a predetermined algorithm is carried out. Furthermore, a correspondence information storage step, of storing information, indicating the correspondence between the "filename-for-user" and the "filename-for-storage," as the "filename correspondence information" for the user who is logged in, is carried out. In the case of the above example, the filename-for-user, "sales book for April," is converted to the filename-for-storage, "RST123," and the information indicating the correspondence between "sales book for April" and "RST123" is stored in correspondence information storage unit 80 as the "filename correspondence information" for user α. A file storage step, of storing the file (data D1) to be stored in memory 10 under the filename-for-storage, "RST123," by means of storage processing unit 30, is then executed.

Oppositely to perform a readout process of reading out data in a file stored in file storage unit 50, first, a reading user recognition step, wherein the user who is logged in at the present time is recognized by user recognition unit 90, is carried out. A readout filename input step, wherein the "filename-for-user" for specifying the file to be read out is input by means of spread control unit 45, is carried out, and furthermore, a filename referencing step, of referencing the "filename-for-storage," corresponding to the input "filename-for-user," based on the "filename correspondence information" for the logged-in user, is carried out. Lastly, a file readout step, wherein the file stored in file storage unit 50 under the "filename-for-storage," obtained by the referencing, is read out as the file to be read out by means of spread processing unit 40, is executed. In the case of the above example, when user α, who is logged in, inputs the filename-for-user, "sales book for April," the "filename correspondence information" for user α is referenced so that the filename-for-storage, "RST123," which corresponds to the input filename-for-user, is referenced and read out onto memory 10.

Actually, when the readout process is performed, the filenames of the files stored in file storage unit 50 are presented to user α in the state of having been converted to the "filenames-for-user." This is because, as described above, the processes, of referencing and performing the list display of the "filenames-for-user" corresponding to the respective files stored in file storage unit 50 based on the "filename correspondence information" for the user α that is stored in correspondence information storage unit 80, are executed by filename presentation unit 60 and presentation control unit 65. By a method of selecting a specific filename from among the filenames displayed in the list, user α can perform the task of inputting the filename-for-user, "sales book for April."

<<<Section 3. Characteristics of this Invention's Computer System>>>

The characteristics of the computer system shown in FIG. 2 shall now be considered. A first characteristic of this system is that although user α him/herself recognizes that he/she performed the operations of storing the three files F1 to F3 under the filenames-for-user of "sales book for April," "sales book for May," and "sales book for June," files F1 to F3 stored in file storage unit 50 are actually stored under the filenames-for-storage of "RST123," "UVW456," and "XYZ789." Thus, even if the files in file storage unit 50 are accessed by an illicit method, security will be ensured at least in regard to the filenames. That is, for an illicitly accessing party, files F1 to F3 will be recognized as files having the filenames-for-storage, "RST123," "UVW456," and "XYZ789," and the contents thereof thus cannot be inferred.

A second characteristic of this system is that since the proper user α can always perform file designation with the "filename-for-user," assigned by user α him/herself, user α does not need to be aware of the existence of "filenames-for-storage" at all, even for a file to be read out from file storage unit 50 and spread on memory 10. Since in actuality, the filenames presented by filename presentation unit 60 to user α are the filenames-for-user of "sales book for April," "sales book for May," and "sales book for June," user α can feel as if the three files F1 to F3 are stored in file storage unit 50 with these filenames as they are. Moreover, even for designating a file to be read out from file storage unit 50 and spread on memory 10, designation by the filename-for-user is carried out. For example, when the designation, "sales book for April," is made, the corresponding file of the filename-for-storage, "RST123," will be automatically referenced by spread control unit 45 and the reading process is carried out on file F1 as described above. Since for user α, it will thus seem as if just file operations using the "filenames-for-user" are being carried out, the operability will be no different from a conventional computer system.

A third characteristic of the present system is that even in a multi-user environment in which the use of the same computer system is shared by a plurality of users, adequate security can be ensured in regard to filenames. This characteristic shall now be described by way of a more specific example. Here, a case where a user α, who is an accounting staff, and a user β, who is a sales staff, share the use of the same computer system, such as shown in FIG. 2, shall be considered. In this case, separate and independent filename correspondence information is stored according to each individual user in correspondence information storage unit 80.

FIG. 3 is a diagram showing a state wherein filename correspondence information for user α and filename correspondence information for user β coexist inside correspondence information storage unit 80. The filename correspondence information for user α, shown at the left side of the FIGURE, makes up a correspondence table prepared for the case where user α assigns the filenames-for-user, "sales book for April," "sales book for May," and "sales book for June," in storing the three files F1, F2, and F3. Meanwhile, the filename correspondence information for user β, shown at the right side of the FIGURE, makes up a correspondence table prepared for the case where user β assigns the filenames-for-user, "company X customer file," "company Y customer file," and "company Z customer file," in storing the three files F4, F5, and F6. Though in both correspondence tables, the filenames-for-user are character strings related to the contents of the files, the filenames-for-storage are codes that are irrelevant to the contents of the file.

FIG. 4 is a diagram showing an example of the storage state of the six files F1 to F6 stored in file storage unit 50 by the users α and β. The respective files are stored under the "filenames-for-storage" in the correspondence tables shown in FIG. 3. Thus, even if access to the files in file storage unit 50 is made by an illicit method, security will be ensured at least in regard to the filenames.

The manners in which the filenames of the six files F1 to F6, stored in file storage unit 50, are presented when the respective users log in are illustrated in FIGS. 5A and 5B. FIG. 5A shows the filename list that is presented to user α when user α logs in, and FIG. 5B shows the filename list that is presented to user β when user β logs in. As illustrated, for user α, a display using the "filenames-for-user" as they are is carried out for the files of "sales book for April," "sales book for May," and "sales book for June," which were stored by user α him/herself. However, for the three files stored by user β, since a display by the "filenames-for-storage" is carried out, the contents of the respective files cannot be inferred from the filenames. Oppositely, for user β, a display using the "filenames-for-user" as they are is carried out for the files of "company X customer file," "company Y customer file," and "company Z customer file," which were stored by user β him/herself. However, for the three files stored by user α, since a display by the "filenames-for-storage" is carried out, the contents of the respective files cannot be inferred from the filenames.

Such a filename list display is carried out since presentation control unit 65 references the filename correspondence information for the currently logged-in user from inside correspondence information storage unit 80. For example, when user α is logged in, since the correspondence table of filename correspondence information for user α, shown at the left side of FIG. 3, is referenced. Therefore, a display through conversion to the filenames-for-user "sales book for April," "sales book for May," and "sales book for June" is carried out for the filenames-for-storage, "RST123," "UVW456," and "XYZ789," which are indicated in the relevant correspondence table, whereas the filenames-for-storage, "ABC147," "DEF258," and "GHI369," which are not indicated in the relevant correspondence table, are displayed as they are, and the list display is thus performed as shown in FIG. 5A.

The same applies to environments shared by three or more users, and whereas files stored by one's self are displayed with the "filenames-for-user," files stored by others are displayed with the "filenames-for-storage." The same also applies in cases where another computer system is logged into via a network, and though the existence of files stored by others can be recognized from the filename list, the files, for which filenames that enable the inference of the file contents can be recognized, are limited to the files stored by one's self.

As a matter of course, since the present invention is not an art of restricting the access to files stored by others, if when user α is logged in, the filename list shown in FIG. 5A is displayed, user α is able to execute the process of spread onto memory 10 (the process of opening a file by an application program) on any of the six files displayed in the list. For example, when user α performs an input (for example, a double-click operation) of indicating the filename, "sales book for April," shown in the first row of FIG. 5A, as the filename of the file to be opened, the filename, "RST123," is referenced as mentioned above from this filename and file F1 in file storage unit 50 is spread on memory 10. Meanwhile, if user α performs an input (for example, a double-click operation) of indicating the filename, "ABC147," shown in the fourth row of FIG. 5A, as the filename of the file to be opened, this filename will be transmitted as it is to spread processing unit 40 and file F4 inside file storage unit 50 will be spread on memory 10.

The present invention is an art that provides the effect of keeping secret the filenames of files stored by one from others and is not an art of restricting access rights. However, the effect that the proper filenames, listed in a filename list, of files besides those stored by one's self are kept secret is an important effect from the viewpoint of ensuring security related to filenames. As a matter of course, for practical use, this invention's art may be used in combination with an art of restricting access rights as necessary.

Actually, it is not difficult to apply the present invention in an existing computer system. For practical use, this invention's computer system can be structured by incorporating a dedicated application program in a personal computer or other existing computer.

Figure 6:
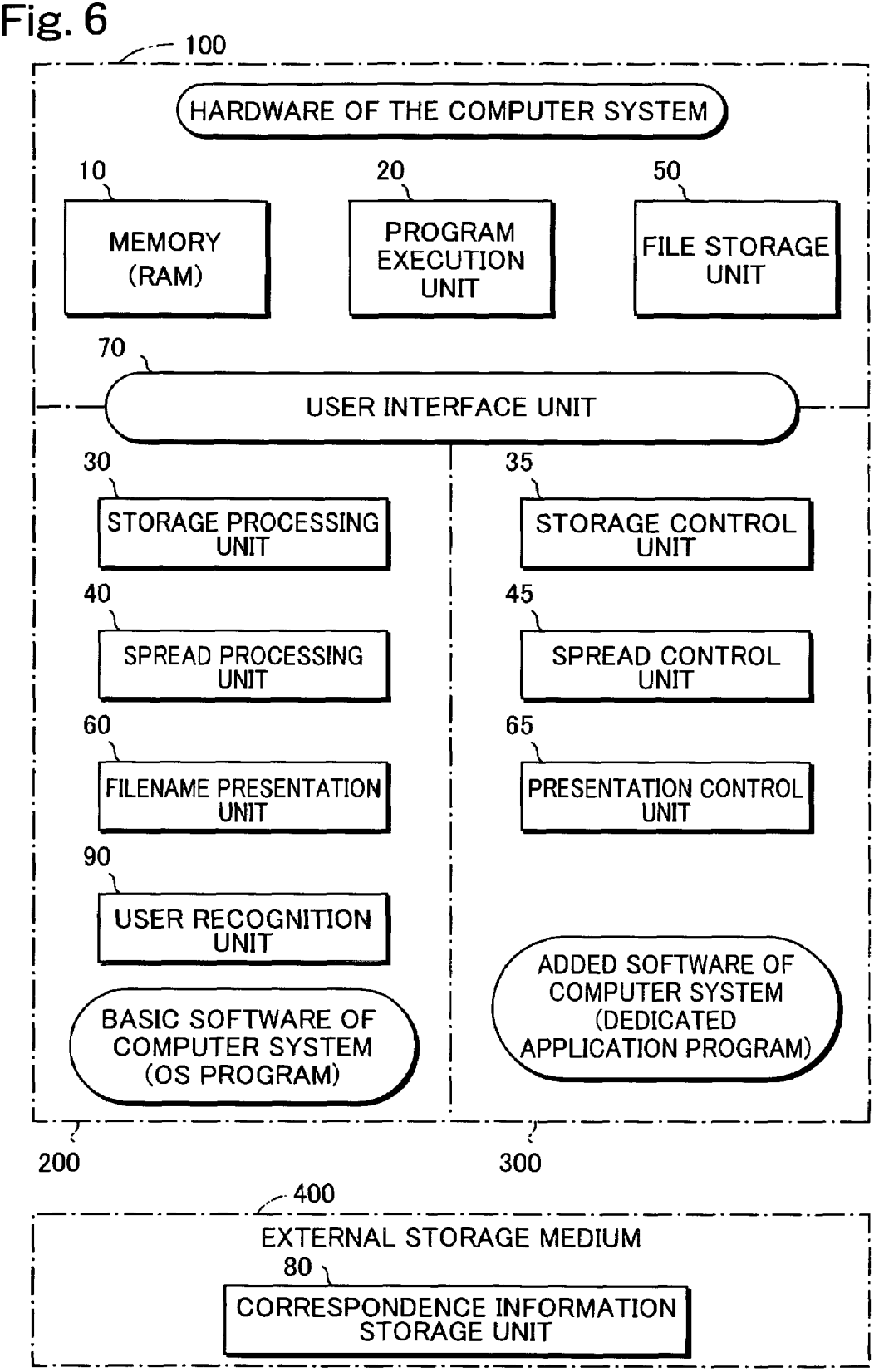
FIG. 6 is a block diagram showing an example of allocation of roles among hardware and software for arranging the computer system shown in FIG. 2.

FIG. 6 is a block diagram showing an example of allocation of roles among hardware and software for arranging the computer system shown in FIG. 2. As illustrated, memory 10, program execution unit 20, and file storage unit 50 can be arranged from hardware 100 of the computer system, and storage processing unit 30, spread processing unit 40, filename presentation unit 60, and user recognition unit 90 can be arranged from a basic software 200 (for example, an OS program) of the computer system. User interface unit 70 can be arranged by a combination of the hardware and the software. Actually, memory 10, program execution unit 20, storage processing unit 30, spread processing unit 40, file storage unit 50, filename presentation unit 60, user interface unit 70, and user recognition unit 90 can be said to be components that are equipped by standard by a conventionally used personal computer or other general computer system.

Thus, in applying this invention to this general computer system, portions that are to serve the functions of storage control unit 35, spread control unit 45, and presentation control unit 65 are added as illustrated as an added software 300 (dedicated application program) to the computer system. This added software 300 executes the respective functions in linkage with basic software 200.

Correspondence information storage unit 80 can be realized using an arbitrary storage device prepared in an existing computer system. With the illustrated example, correspondence information storage unit 80 is provided on an external storage medium 400. This external storage medium 400 is a portable information storage medium that is removable with respect to the main body of the computer system. For example, a flash memory device or IC card, etc., may be used as external storage medium 400. By thus providing correspondence information storage unit 80 on external storage medium 400 and enabling the carrying of this external storage medium 400 upon removal from the computer system main body in the logged-out state, the security concerning filenames can be improved further.

By providing the functions of storage control unit 35, spread control unit 45, and presentation control unit 65 as a dedicated application program as shown in FIG. 6, since storage control unit 35, spread control unit 45, and presentation control unit 65 will then be made to operate only when this program is started up, it becomes possible to make the computer system function as the conventional, general computer system with the arrangement shown in FIG. 1 in the state in which the above-mentioned program is not started up. In order to make the computer system function as this invention's computer system with the arrangement shown in FIG. 2, the above-mentioned program is to be started up. Such an application program may obviously be recorded and distributed in a CD-ROM or other computer readable storage medium.

<<<Section 4. Another Embodiment of this Invention>>>

Figure 7:
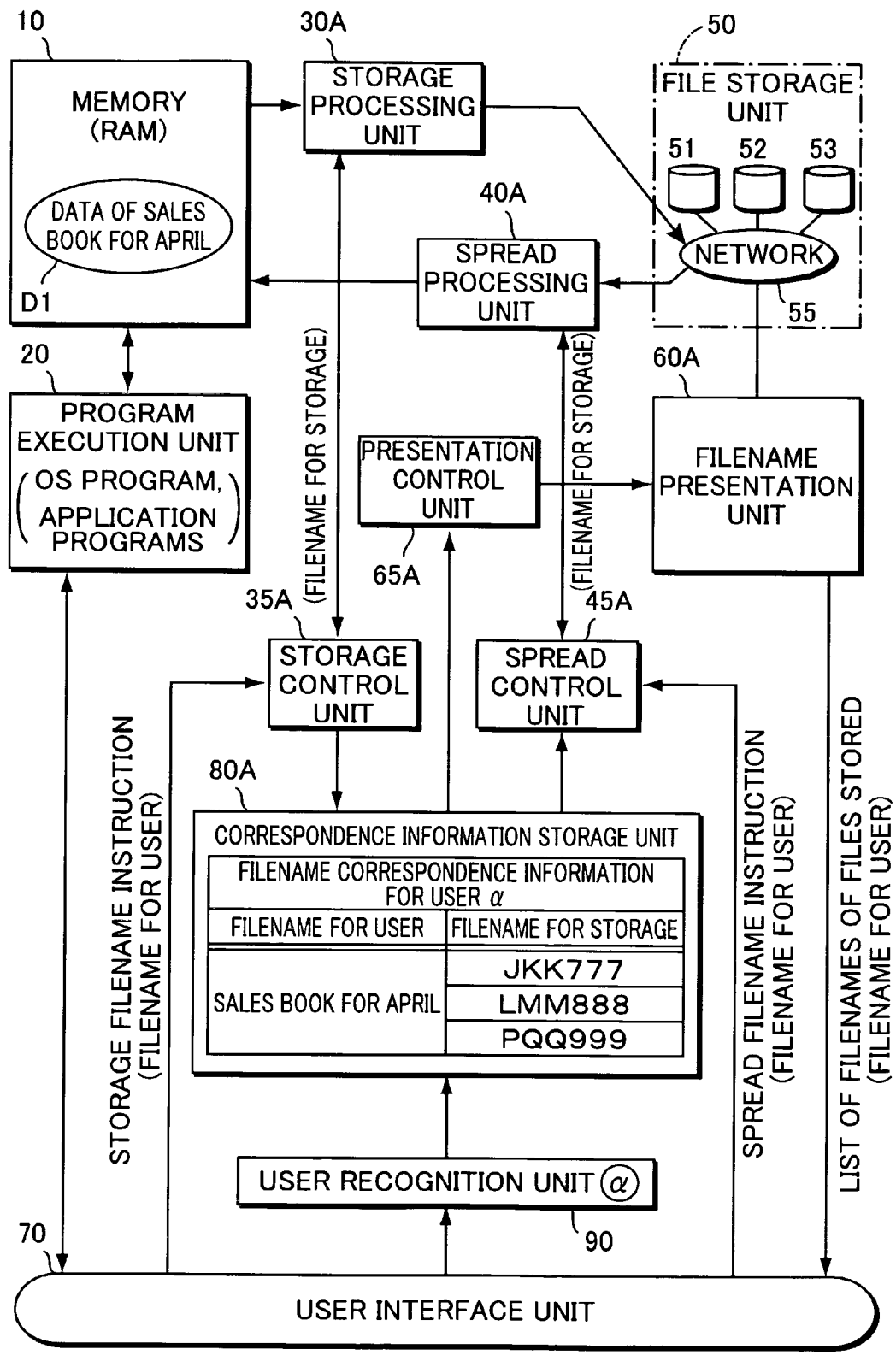
FIG. 7 is a block diagram showing a computer system of another embodiment of this invention.

Another embodiment of this invention shall now be described. FIG. 7 is a block diagram showing a computer system of another embodiment of this invention. A major difference between the system shown in FIG. 7 and the system shown in FIG. 2 lies in the arrangement of file storage unit 50. That is, with the system shown in FIG. 7, file storage unit 50 is arranged from a plurality of data storage devices 51 to 53 that are connected via a network 55. That is, file storage unit 50 is arranged from the plurality of data storage devices 51 to 53 that are configured in a distributed manner. Also, with a storage processing unit 30A, a storage control unit 35A, an spread processing unit 40A, an spread control unit 45A, a filename presentation unit 60A, and a correspondence information storage unit 80A shown in FIG. 7, some additional processing functions are added to the corresponding components shown in FIG. 2.

Figure 8A:
FIGS. 8A-8C show diagrams for describing the operations of the computer system shown in FIG. 7.
Figure 8B:
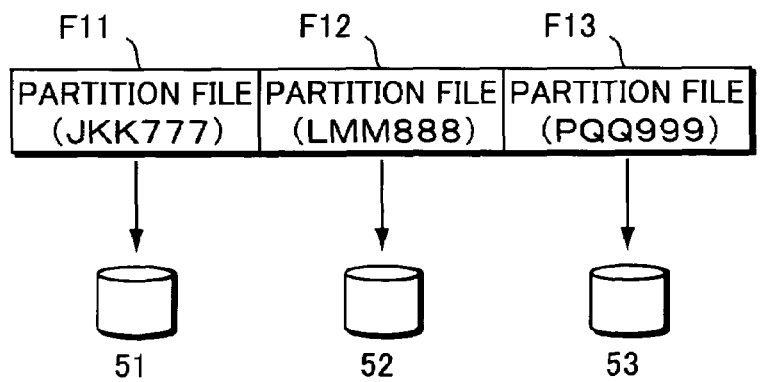
Figure 8C:
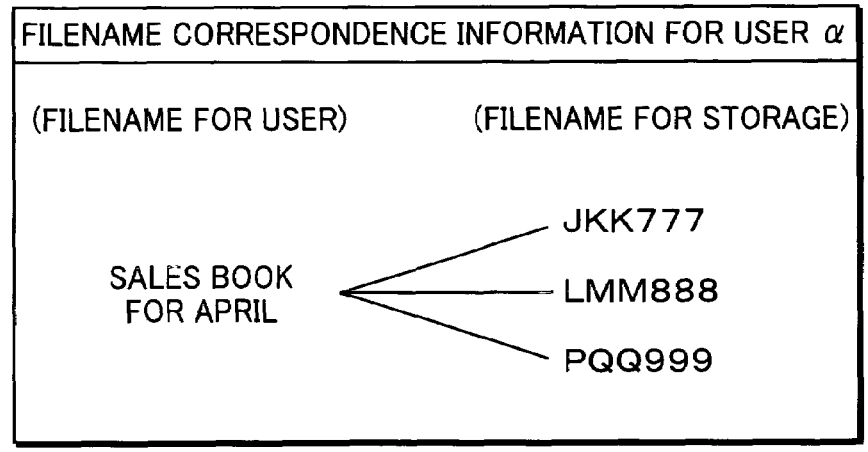

A characteristic of the computer system shown in FIG. 7 is that data D1 on memory 10 are partitioned into a plurality of partition files that are stored distributedly among different data storage devices. FIGS. 8A-8C show diagrams for describing the concepts of this distributed storage process. Suppose now that file F1 (data D1 on memory 10), shown in FIG. 8A, is the file to be stored and a user has provided a storage instruction by inputting, the filename-for-user, "sales book for April," to this file to be stored.

Storage processing unit 30A stores this file F1 (data D1) on memory 10 into file storage unit 50, and in this process, executes a process of dividing the file F1 to be stored into a plurality of partition files and storing the respective partition files into different data storage devices. For example, FIG. 8B shows an example of preparing three partition files F11, F12, and F13 by the division of file F1 into three and storing these partition files in data storage devices 51, 52, and 53, respectively via network 55. Partition files F11, F12, and F13 may be prepared by dividing file F1 in order from the head portion or may be prepared by another method, such as that whereby the 1st, 4th, 7th . . . bytes from the head of file F1 are contained in partition file F11, the 2nd, 5th, 8th, . . . bytes are contained in partition file F12, and the 3rd, 6th, 9th . . . bytes are contained in partition file F13. Also the division does not necessarily have to be carried out uniformly, and a dividing method whereby the volumes of the respective partition files F11, F12, and F13 differ from each other may be employed.

With the example shown in FIG. 8B, the respective partition files F11, F12, and F13 are stored in the respective data storage devices 51, 52, and 53, upon being assigned the filenames-for-storage, "JKK777," "LMM888," and "PQQ999," respectively, and these filenames-for-storage are assigned by storage control unit 35A. In this case, storage control unit 35A executes a process of converting the filename-for-user, "sales book for April," to the filenames-for-storage, "JKK777," "LMM888," and "PQQ999," for the three partition files. Thus, in correspondence information storage unit 80A is stored the filename correspondence information that indicates the correspondence of a "single filename-for-user" to a "plurality of filenames-for-storage" that are used as the respective filenames of the partition files. FIG. 8C shows a specific example of filename correspondence information for user α that is stored in the above manner.

Such division of a single file into a plurality of partition files and storing of the respective partition files in different data storage devices that are configured distributedly is useful for improving security concerning file access. For example, when the internet is used as network 55, numerous file server devices that are positioned distributedly across the whole world can be used respectively as individual data storage devices. Thus, if management information, which indicates by which method and into how many partition files file F1 was divided and indicates into which data storage devices the individual partition files were stored by storage processing unit 30A, is not available, the respective files that were stored upon division cannot be read out and synthesized to be restored to the original file F1. Moreover, with the present invention, since the filename-for-user, "sales book for April," which the user assigned to file F1 to be stored, is converted by storage control unit 35A into the filenames-for-storage, "JKK777," "LMM888," and "PQQ999," and the actual partition files are stored under these filenames-for-storage, the security concerning filenames can also be ensured adequately.

Actually, even if data storage device 51, shown in FIG. 7, is subject to some form of illicit access attack, what will become exposed is partition file F11, to which the filename, "JKK777," is assigned. Here, the filename, "JKK777," is a meaningless filename that has no relevance to the contents of the file, and due to containing only a portion of the data of the original file F1, partition file F11 will not be a file indicating meaningful information on its own.

When proper user α is to use the file stored under the filename, "sales book for April," by reading it out onto memory 10, first, the "filenames-for-storage" of the partition files stored in file storage unit 50 are collected by filename presentation unit 60A and then presentation control unit 65A is made to reference the "filename-for-user" corresponding to the collected "filenames-for-storage" using the filename correspondence information in correspondence information storage unit 80A and present the "filename-for-user" to user α. When user α selects the filename, "sales book for April," in the presented filename list, spread control unit 45A converts this filename to the filenames-for-storage, "JKK777," "LMM888," and "PQQ999," and instructs spread processing unit 40A to perform the reading process on the relevant files.

Since the filename correspondence information are stored inside correspondence information storage unit 80A, filename presentation unit 60A may, in place of performing the process of collecting the "filenames-for-storage" of the partition files stored in file storage unit 50, reference the filename-for-user column of the filename correspondence information in correspondence information storage unit 80A and present the list of filenames of the files stored to the user. However, there is a problem in that in a case where a file stored in file storage unit 50 is deleted due to some reason, a mismatch will arise between the filename correspondence information in correspondence information storage unit 80A and the files that are actually stored in file storage unit 50.

Spread processing unit 40A has a function of synthesizing, based on management information that had been stored somewhere in advance, the plurality of partition files F11 to F13 that are respectively stored in the different data storage devices 51 to 53 and performing spread on memory 10 upon restoration to the original file F1. As a result, the data, which user a stored under the filename, "sales book for April," are read out from file storage unit 50 and spread again on memory 10.

<<<Section 5. Various Measures Taken in Putting this Invention into Practice>>>

Lastly, various measures that are taken in putting this invention into practice shall be described.

(1) Filename Conversion Process by the Storage Control Unit

With the present invention, the filename conversion process, whereby a "filename-for-user," input by a user is converted to a "filename-for-storage" based on a predetermined algorithm, is executed at storage control unit 35. With the example shown in FIG. 2, the filename-for-user, "sales book for April," is converted to the filename-for-storage, "RST123." Though any algorithm may be used as the algorithm of this conversion process, in order so that the "filename-for-storage" that is obtained after the conversion will be a meaningless filename that has no relevance whatsoever to the original "filename-for-user," the filename conversion process is preferably executed so that "a filename-for-storage containing a random code" is generated based on an algorithm that uses random numbers. For example, by generating the filename-for-storage as "three alphabetical characters generated randomly+three numerals generated randomly," a filename-for-storage, such as "RST123" can be generated.

As a matter of course, the algorithm for the filename conversion process from the "filename-for-user" to the "filename-for-storage" does not necessarily have to be made an algorithm that uses random numbers. For example, a code string that is obtained by applying a hash function to the code string making up the "filename-for-user" may be used as the "filename-for-storage."

Also, though in the above-described embodiment, a correspondence table indicating the correspondence between the "filenames-for-user" and the "filenames-for-storage" was stored in correspondence information storage unit 80 as the filename correspondence information, the filename correspondence information does not necessarily have to be prepared in the form of a correspondence table. For example, in a case where storage control unit 35 executes the filename conversion process whereby the "filename-for-storage" is generated based on an algorithm of a reversible conversion of the "filename-for-user" to the "filename-for-storage," as long as information indicating this reversible conversion algorithm are stored as the filename correspondence information, a correspondence table indicating the correspondence of the individual filenames will be unnecessary.

This shall now be described by way of a specific example. Here, suppose that a conversion algorithm of "making the filename-for-storage be the character string obtained by shifting each individual character making up the filename-for-user rearwards by one character in alphabetical order" is established. Using this conversion algorithm, the filename-for-user, "APPLE," will be converted to the filename-for-storage, "BQQMF," and the filename-for-user, "BANANA," will be converted to the filename-for-storage, "CBOBOB." In this case, though a correspondence table indicating the correspondence of each case, that is, the correspondence of "APPLE" and "BQQMF" and the correspondence of "BANANA" and "CBOBOB" may be prepared, information indicating the conversion algorithm of "making the filename-for-storage be the character string obtained by shifting each individual character making up the filename-for-user rearwards by one character in alphabetical order" may in itself be prepared as the filename correspondence information instead. This is because this conversion algorithm is reversible and since the reverse conversion of "making the filename-for-user be the character string obtained by shifting each individual character making up the filename-for-storage frontward by one character in alphabetical order" is possible, and thus as long as the information indicating this conversion algorithm is available, bidirectional conversion between "APPLE" and "BQQMF" and bidirectional conversion between "BANANA" and "CBOBOB" are enabled even without a correspondence table.

(2) Subjects of the Conversion Process

In many computer operating systems, extensions are employed in filenames. For example, with the filename, "sales book for April.xls," the portion of "sales book for April" to the left side of the dot is the main filename portion and the portion of "xls" to the right side of the dot is the extension. In this case, if just the main filename portion is subject to the conversion process, a filename-for-storage, such as "RST123.xls," will be generated for the filename-for-user, "sales book for April.xls." However, unless the extension portion is subject to the conversion process, the application program that was used to prepare the file or the format of the file can be recognized by seeing the extension portion of the filename-for-storage and this may provide a clue to inferring the contents of the file. Thus, for practical use, the filename conversion process is preferably executed on the entire filename, including the extension portion.

For example, if separate and independent conversion processes are performed on the main filename portion and the extension portion, respectively, a filename-for-storage, such as "RST123.jqz," will be generated for the filename-for-user, "sales book for April.xls." In this case, since the extension, "jqz," is a random extension without meaning, it will not provide a clue to inferring the contents of the file.

Also, depending on the computer operating system, a function, of storing various attribute information, such as timestamps (information indicating the time and date of preparation, time and date of modification, etc., of the file), file volume, and information on the person who prepared the file, along with the data of the file itself, is provided. With an operating system having such a function, these attribute information can be displayed in a list along with the filenames when a filename list of the stored files is displayed. However, such attribute information may also be factors that provide clues to inferring the file contents. For example, if the filename-for-user of "sales book for April" is converted to the filename-for-storage of "RST123," though the file contents cannot be inferred from the filename, if a timestamp, such as "04-30-2004" is displayed along with the filename of "RST123," this may provide the clue for the inference that "this file is some form of data for April."

In order to avoid such an adverse effect, storage control unit 35 is made to execute the conversion process of converting not just the filename but also the contents of the attribute information, such as the timestamps, etc., that are stored along with the file, correspondence information storage unit 80 is made to execute a process of storing not just the correspondence of the filenames but also the correspondence of the attribute information before and after the conversion as the filename correspondence information, and spread control unit 40 is made to execute the process of restoring the contents of the attribute information, which had been changed in the storing process, based on the correspondence of the attribute information before and after the conversion.

In the case of the above example, the file is stored upon conversion of the filename-for-user of "sales book for April" to the filename-for-storage of "RST123" and conversion of the timestamp of "04-30-2004" to a random timestamp, such as "48-95-2345." In correspondence information storage unit 80, the correspondence of "04-30-2004" and "48-95-2345" is stored along with the correspondence of "sales book for April" and "RST123." While when the user who carried out the file storage is logged in, the filename and the timestamp will obviously be reconverted and presented by presentation control unit 65 as "sales book for April" and "04-30-2004" as they were, when another user is logged in, the filename and the timestamp will be presented as "RST123" and "48-95-2345."

(3) Encryption of the Filename Correspondence Information

Though with the above-described embodiment, the filename correspondence information is stored as it is in correspondence information storage unit 80, when another user accesses the interior of this correspondence information storage unit 80, the correspondence between the "filenames-for-user" and the "filenames-for-storage" will be recognized. In particular, when the filename correspondence information is prepared in the form of a correspondence table, the filenames, such as "sales book for April," "sales book for May," and "sales book for June," will appear as they are in the "filename-for-user" column and it is not preferable for such a list of filenames to be seen by other users.

In order to avoid such an adverse effect, correspondence information storage unit 80 is made to execute a process of encrypting and then storing the filename correspondence information and to execute, upon receiving a reference of the filename correspondence information that is stored, a process of presenting the information to be referenced upon decrypting. Since by using a password, etc., unique to each user as a key for the encryption and decryption processes, the filename correspondence information of user $\alpha$ will be encrypted using the password, etc., of user $\alpha$ as the key, the information will not be decrypted when another user is logged in.

INDUSTRIAL APPLICABILITY

This invention is widely applicable to general computer systems that handle data in file units and store a file upon providing some form of filename, and is especially high in utility value in data processing fields, wherein there is a need to ensure adequate security, even for filenames.

The invention claimed is:

1. A single unit computer system comprising only one computer with only one operating system, the computer system comprising: a memory (10), whereon data are spread; a program execution unit (20), applying processes, based on a predetermined program including an OS program, to the data spread on the memory; a file storage unit (50), storing files formed of predetermined data; a storage processing unit (30), storing the data, spread on the memory, into the file storage unit as a file having an instructed, predetermined filename: a filename presentation unit (60), presenting, to a user, filenames corresponding to the respective files stored in the file storage unit; a spread processing unit (40), spreading, on the memory, data inside a file corresponding to a specific filename selected by the user from among the filenames presented by the filename presentation unit; and a user interface unit (70), serving an interface function with respect to the user;

the computer system further comprising:
a user recognition unit (90), recognizing a user who is logged in the computer system under operation of said OS program at the present time;
a storage control unit (35), which, when the storage processing unit (30) is storing a file, inputs a filename-for-user under operation of said OS program from the user who is logged in, executes a filename conversion process of converting the filename-for-user to a filename-for-storage based on a predetermined algorithm, and provides to the storage processing unit an instruction to perform storage using the filename-for-storage;
a correspondence information storage unit (80), which, when the filename conversion process is carried out by the storage control unit (35), stores information, indicating a correspondence between the filename-for-user and the filename-for-storage, as filename correspondence information for the user who is logged-in;
a presentation control unit (65), which, when the filename presentation unit (60) is performing a presentation of filenames under operation of said OS program, references filename correspondence information for the user who is logged in from inside the correspondence information storage unit (80) and provides an instruction to present the filename-for-user in place of the filename-for-storage based on the filename correspondence information referenced so that said filename presentation unit presents the filename-for-user instead of the filename-for-storage if a correspondence of the filename-for-storage is indicated in the referenced filename correspondence information, whereas said filename presentation unit presents the filename-for-storage as it is if no correspondence of the filename-for-storage is indicated in the referenced filename correspondence information; and a spread control unit (45), which, when the spread processing unit (40) spreads data, inputs an instruction of selection of a filename-for-user under operation of said OS program from the user who is logged in, references filename correspondence information for the user who is logged in from inside the correspondence information storage unit (80), executes a filename conversion process of converting the selected filename-for-user to a filename-for-storage based on the correspondence information referenced, and provides, to the spread processing unit, an instruction to spread data in a file with the filename-for-storage resulting from the conversion.

2. The computer system according to claim 1, wherein: the storage control unit (35) executes the filename conversion process by generating a filename-for-storage that contains at least algorithmically random codes.

3. The computer system according to claim 1, wherein: correspondence information storage unit (80) stores a correspondence table, indicating a correspondence between a filename-for-user and a filename-for-storage, as the filename correspondence information.

4. The computer system according to claim 1, wherein: the storage control unit (35) executes the filename conversion process from a filename-for-user to a filename-for-storage by generating a filename-for-storage based on an algorithm for reversible conversion.

5. The computer system according to claim 4, wherein: the correspondence information storage unit (80) stores information, indicating the reversible conversion algorithm used in the filename conversion process, as the filename correspondence information.

6. The computer system according to claim 1, wherein: the storage control unit (35) executes the filename conversion process on the entirety of a filename, including an extension portion.

7. The computer system according to claim 1, wherein: the storage control unit (35) executes a conversion process of converting not only a filename but also contents of timestamps or other attribute information that are stored along with a file, the correspondence information storage unit (80) executes a process of storing, as the filename correspondence information, not just a correspondence of filenames but also a correspondence of attribute information before and after the conversion process; and the spread control unit (45) executes a process of restoring converted attribute information based on the correspondence of attribute information before and after the conversion process.

8. The computer system according to claim 1, wherein: the correspondence information storage unit (80) executes a process of encrypting and then storing the filename correspondence information and executes, upon receiving a reference of the stored filename correspondence information, a process of decrypting and then presenting the information to be referenced.

9. The computer system according to claim 1, wherein: the correspondence information storage unit (80) is arranged from a portable information storage medium that can be freely attached to and detached from a main body of the computer system.

10. The computer system according to claim 1, wherein: functions of the storage control unit (35), the spread control unit (45), and the presentation control unit (65) incorporate a dedicated application program in a computer and the storage control unit (35), the spread control unit (45), and the presentation control unit (65) are made to operate only when said program is started up.

11. The computer system according to claim 1, wherein: the file storage unit (50) is arranged from a plurality of data storage devices (51, 52, 53) that are configured distributively, the storage processing unit (30A) is provided with a function of dividing a file to be stored into a plurality of partition files and storing the respective partition files in different data storage devices (51, 52, 53), the spread processing unit (40A) is provided with a function of synthesizing and thereby restoring the plurality of partition files, respectively stored in different data storage devices (51, 52, 53 ), to an original file and then spreading the original file on the memory, and the correspondence information storage unit (80A) is provided with a function of storing filename correspondence information indicating a correspondence of a "single filename-for-user" to a "plurality of filenames-for-storage," used as respective filenames of the partition files.

12. A computer readable storage medium including a program making a computer function as the storage control unit (35), the spread control unit (45), and the presentation control unit (65) of the computer system according to claim 1.

13. A file storage/read-out method that makes a single unit computer system comprising only one computer with only one operating system execute a storage process of storage data as a file with a predetermined filename into a file storage unit (50) and a readout process of reading out data in a file stored in the file storage unit, said method making the computer system execute under operation of a particular OS program, in the storage process;

a storing user recognition step of recognizing a user who is logged in at the present time;

a storage filename input step of inputting a filename-for-user to be assigned to a file to be stored;

a filename conversion step of converting the filename-for-user to a filename-for-storage based on a predetermined algorithm;

a correspondence information storage step of storing information, indicating a correspondence between the filename-for-user and the filename-for-storage, as filename correspondence information for a user who is logged in; and a file storage step of stored the file to be stored into the file storage unit under the filename-for-storage; and in the readout process:

a reading user of recognition step of recognizing a user who is logged in at the present time;

a readout filename input step of inputting a filename-for-user for specifying a file to be read out;

a filename referencing step of referencing a filename-for-storage, corresponding to the input filename-for-user, based on the filename correspondence information for a user who is logged in; and a file readout step of reading out a file, stored in the file storage unit under the filename-for-storage, obtained by the referencing as the file to be read out.

14. The file storage/read-out method according to claim 13, wherein:

the readout filename input step is executed by a method whereby filenames-for-user corresponding to respective files stored in the file storage unit are referenced and displayed in a list based on the filename correspondence information and a user is made to select a specific filename from among the filenames displayed in the list.

\* \* \* \* \*